(12) United States Patent
Tulachan et al.

(10) Patent No.: US 12,006,588 B2
(45) Date of Patent: Jun. 11, 2024

(54) EUTECTIC SOLVENT

(71) Applicants: Offgrid Energy Labs Private Limited, New Delhi (IN); Offgrid Energy Labs Inc., San Francisco, CA (US)

(72) Inventors: Brindan Tulachan, Kanpur (IN); Aasiya Bano Shaikh, Nashik (IN); Sumanta Chakrabarty, Murshidabad (IN)

(73) Assignees: Offgrid Energy Labs Private Limited, New Delhi (IN); Offgrid Energy Labs Inc., San Francisco, CA (US)

( * ) Notice: Subject to any disclaimer, the term of this patent is extended or adjusted under 35 U.S.C. 154(b) by 0 days.

(21) Appl. No.: 17/800,446

(22) PCT Filed: Jun. 21, 2021

(86) PCT No.: PCT/IN2021/050597
§ 371 (c)(1),
(2) Date: Aug. 17, 2022

(87) PCT Pub. No.: WO2021/260723
PCT Pub. Date: Dec. 30, 2021

(65) Prior Publication Data
US 2023/0082242 A1 Mar. 16, 2023

(30) Foreign Application Priority Data
Jun. 22, 2020 (IN) .............................. 202011026185

(51) Int. Cl.
*C25D 3/66* (2006.01)
(52) U.S. Cl.
CPC .................................. *C25D 3/665* (2013.01)

(58) Field of Classification Search
CPC ........................................................ C25D 3/66
(Continued)

(56) References Cited

U.S. PATENT DOCUMENTS

| 9,957,459 B2 | 1/2018 | Patil et al. |
| 2017/0241031 A1* | 8/2017 | Sakurai ..................... C25D 3/58 |

FOREIGN PATENT DOCUMENTS

| CN | 106119815 A | * 11/2016 | ............. C23C 18/34 |
| CN | 108950091 | 7/2018 | |

(Continued)

OTHER PUBLICATIONS

Siddhartha Pandey, "Analytical applications of room-temperature ionic liquids: A review of recent efforts," Analytica Chimica Acta 556 (2006) 38-45; doi:10.1016/j.aca.2005.06.038, published Jul. 20, 2005.

(Continued)

*Primary Examiner* — Edna Wong
(74) *Attorney, Agent, or Firm* — Amit Kulkarni

(57) ABSTRACT

A novel eutectic solvent (NES) includes one or more derivative(s) of methanesulfonic, one or more ammonium salt(s) and one or more hydrogen bond donor(s). The disclosed NES may exhibit qualities such as low freezing and eutectic points, low viscosity, negligible vapor pressure, non-volatility, less water content, high potential window, high thermal stability, high solubility, long shelf life, high recyclability, high biodegradability, high ionic character, air and moisture stability, non-corrosive, non-mutagenic, economical, non-flammable, etc., hence having broader applications.

5 Claims, 3 Drawing Sheets

(58) Field of Classification Search
USPC .................................................. 205/230, 234
See application file for complete search history.

(56) References Cited

FOREIGN PATENT DOCUMENTS

| | | | | |
|---|---|---|---|---|
| JP | 5622678 B2 | * | 11/2014 | ............. C23C 18/34 |
| KR | 20210033305 A | * | 3/2021 | ............. H01G 11/06 |

OTHER PUBLICATIONS

Dongbin Zhao et al., "Toxicity of Ionic Liquids," Clean Journal; DOI: 10.1002/clen.200600015, published 2007.
Emma L. Smith et al., "Deep Eutectic Solvents (DESs) and Their Applications," Chemical Reviews, American Chemical Society, dx.doi.org/10.1021/cr300162p | Chem. Rev. 2014, 114, 11060-11082, published 2014.
Justyna Plotka-Wasylka et.al., "Deep eutectic solvents vs ionic liquids: Similarities and differences," Microchemical Journal 159 (2020) 105539; https://doi.org/10.1016/j.microc.2020.105539, published 2020.
International Search Report and Written Opinion of the International Searching Authority from corresponding Patent Cooperation Treaty (PCT) Application No. PCT/IN2021/050597, indicated completed on Aug. 16, 2021.

* cited by examiner

EUTECTIC SOLVENT

CROSS REFERENCE TO RELATED APPLICATIONS

The present application is a § 371 national stage of International Application PCT/IN2021/050597, filed Jun. 21, 2021, which claims priority benefit of India Pat. Application Ser. No. 202011026185, filed Jun. 22, 2020, both of which are hereby incorporated herein by reference in their entireties.

FIELD OF INVENTION

The present invention directs generally to chemical solvents and, more particularly, to eutectic solvents containing derivative(s) of the methanesulfonic acid and having broad application prospects.

BACKGROUND OF THE INVENTION

Solvents are the chemical substances which dissolve a solute and have various applications in chemical, pharmaceutical, oil & gas industries, etc. for multiple processes and applications including but not limited to electrochemical application, chemical synthesis, electroplating, purification processes, etc. The applications of solvents generally involve their utilization in bulk quantities. Typically, solvents constitute around 80% of the total volume of chemicals used in a specific application/ process.

The conventional solvents including ethylene carbonate, dimethyl carbonate, propylene carbonate, etc., used in industries are highly toxic, volatile, irritant, carcinogenic, mutagenic, costly, difficult to dispose to electrochemical application, chemical synthesis, electroplating, purification processes to electrochemical application, chemical synthesis, electroplating, purification processes off, etc. making them unsuitable for large scale industrial application. Hence, possible alternatives to the conventional solvents are being searched, experimented, invented, developed and improved for a long time.

Various alternatives were proposed from time to time. Still, they had limited application due to slow kinetics (rate of the reactions at which reaction proceeds), low efficiencies and high capital cost.

The toxic solvents utilized in the chemical industries can be simply replaced by the less harmful organic solvents like ethyl alcohol; however, substitutions like these can result in the synthetic restriction as well as can be non-economical.

In search of green and sustainable alternative solvents as a replacement to the conventional solvents, Ionic liquids have been studied and experimented upon since several decades. Several ionic liquids have been found as prominent alternatives to the conventional solvents due to their unusual physical and chemical properties, e.g. wide electrochemical potential window, high ionic conductivity, negligible vapor pressures, wide temperature range at which solvent remain at a liquid state, excellent thermal stability, adjustable solubility for both organic and inorganic molecules, and much synthetic flexibility. Further, the discovery of room temperature ionic liquids (RTIL) has increased application of ionic liquids as solvents. A review article titled as "Analytical applications of room-temperature ionic liquids: A review of recent efforts" by Siddhartha Pandey published at Analytica Chimica Acta 556 (2006) 38-45; doi:10.1016/j.aca.2005.06.038, mentioned potential of RTIL in detail.

However, ionic liquids can have their own limitations and shortcomings. Ionic liquids are mostly manufactured from petrochemical resources, and most production routes require the involvement of halogen atoms. Use of halogen components in ionic liquids is unwanted, because of low hydrolysis stability, high toxicity. The further production cost of RTIL, compared to conventional solvents, are real limitations in order to enlarge its applications in the industry. Also, several additional disadvantages have been observed with common ionic liquids, such as limited solute solubility, high viscosity, low biodegradability and high disposal cost, etc. A review article titled as "Toxicity of Ionic Liquids" by Dongbin Zhao et. al. published in clean journal; DOI: 10.1002/clen.200600015, mentions about toxicity of Ionic liquids.

In the year 2003, a new class of ionic liquids called eutectic solvent (ES), also popularly known as Deep Eutectic Solvent, was proposed by Abbott et al. which contained quaternary ammonium salt like choline chloride and urea in a molar ratio of 1:2.

ESs are eutectic liquids having melting points that are much lower than the melting point of the corresponding compounds that are complexed in the synthesis of the solvent. ES is formed by mixing Lewis or Bronsted acid and bases with different cationic and anionic species. A review report titled as "Deep Eutectic Solvents (DESs) and Their Applications" by Emma L. Smith et. al. published in Chemical Reviews published by American Chemical Society, dx.doi.org/10.1021/cr300162p|Chem. Rev. 2014, 114, 11060-11082 has discussed various aspects of various existing ESs. Another review report titled as "Deep eutectic solvents vs ionic liquids: Similarities and differences" published in Microchemical Journal by Justyna Plotka-Wasylka et.al.; https://doi.org/10.1016/j.microc.2020.105539, has compared characteristics of Ionic Liquids against Eutectic solvents.

Commonly available ESs are mixtures of the quaternary ammonium salts complexed with various hydrogen bond donor compounds in a particular molar ratio. The purity of the resulting ESs depends on the purity of the corresponding individual components. ESs are easy to manufacture in a cost-effective manner and does not involve any post purification problem and considered to be easily disposable in comparison of the conventional solvents and the existing Ionic solvents. ESs are preferably liquid at ambient temperatures. ESs are rapidly gaining interest as alternative green solvents due to their enormous potential and industrial applications as solvents. Further ESs have found their application in absorption of $CO_2$ however the same is still at nascent stage and there is a great scope of improvement.

However, like other solvents used in the chemical industries, existing ESs have their limitations. Usage of various kinds of quaternary ammonium salts is common in the synthesis of existing ESs; however, the majority of the quaternary ammonium salts are toxic. Generally, the components are stored in a vacuum and need drying before utilization for preparation of the ES. While preparing commonly existing ESs, components are mixed and slowly heated at around 100 degrees Celsius for 8-10 hours and are needed to store in a vacuum. Most of the ESs are very viscous in nature and difficult to handle. There are lots of scopes for improvement/amendment in the manufacturing process and time required for manufacturing ESs. Further, existing ESs requires special arrangement for storage in order to retain their property. Hence there is a requirement of a novel ES having answers to the limitations present in the existing ESs and having improvements in desired features like low freezing and eutectic points, low viscosity, negligible vapour pressure, non-volatility, less water content, high potential window, high thermal stability, high solubility, long shelf life, high recyclability, high biodegradability, high ionic character, air and moisture stability, non-corrosive, non-mutagenic, economical, non-flammable etc., hence having broader applications.

SUMMARY OF THE INVENTION

The present invention discloses a Novel Eutectic Solvent (NES) which has answers to the limitations of the existing ESs and has desired improved characteristics as mentioned above over the existing ESs and has wider applications.

The NES is comprising one or more derivative(s) of methanesulfonic acid selected from its salts with various metal ions selected from a group consisting of manganese, zinc, cerium, nickel, titanium, copper, sodium, potassium and calcium; one or more ammonium salt(s) having general formula $NH_4X$, where X can be selected from a group consisting of chloride, methanesulfonate, acetate, sulphate, triflate, trimethanesulfonate ; one or more hydrogen bond donor(s) selected from a group consisting of urea, thiourea, glycerol, oxalic acid, acetic acid, ethylene glycol, acetamide, benzamide, adipic acid, benzoic acid, citric acid ; wherein the molar ratio of derivative(s) of methanesulfonic acid, ammonium salt(s) and hydrogen bond donor(s) is in the range 0.5-3:2-7:8-13. The NES having potential window ranging from 0.1 to 3.5 V and conductivity ranging from 10 to 90 mS/cm. Further the NES is having viscosity ranging from 1 to 60 mPa·s. NES remains liquid at a temperature as low as 5° C. at ambient pressure.

These and other objects, advantages and features of the invention will become apparent upon review of the following specification in conjunction with the drawings.

DETAILED DESCRIPTION OF PREFERRED EMBODIMENTS

I. DEFINITIONS

Figure 1:
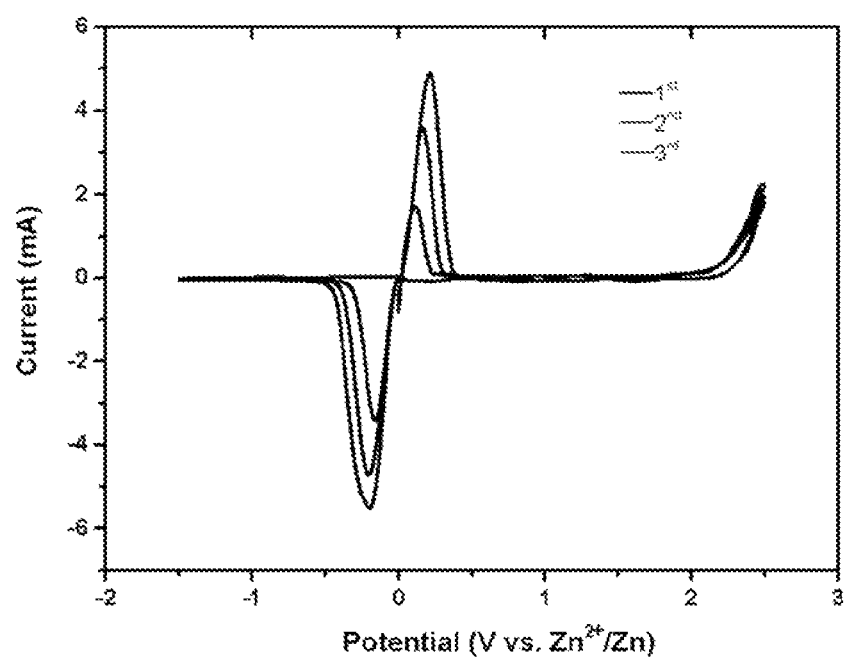
FIG. 1 is a cyclic voltammetry curve of NES of Example 1 on a three-electrode system at a scan rate of 1 mV/s.

For purposes of interpreting the specification and appended claims, the following terms shall be given the meaning set forth below:

The term "solvent" shall refer to a liquid medium capable of dissolving other substance(s).

The term "ambient temperature" shall mean temperature falling in the range of 25 to 30° C.

The term "ambient pressure" shall mean atmospheric pressure at 1 bar.

II. DESCRIPTION

Reference is hereby made in detail to various embodiments according to present invention, examples of which are illustrated in the accompanying drawings and described below. It will be understood that invention according to present description is not intended to be limited to those exemplary embodiments. The present invention is intended to cover various alternatives, modifications, equivalents and other embodiments, which may be included within the spirit and scope of the invention as defined by the claims.

The Novel Eutectic Solvent (NES) includes one or more derivative(s) of methanesulfonic acid selected from its salts with various metal ions selected from a group consisting of manganese, zinc, cerium, nickel, titanium, copper, sodium, potassium and calcium; one or more ammonium salt(s) having general formula $NH_4X$, where X can be selected from a group consisting of chloride, methanesulfonate, acetate, sulphate, triflate, trimethanesulfonate; one or more hydrogen bond donor(s) selected from a group consisting of urea, thiourea, glycerol, oxalic acid, acetic acid, ethylene glycol, acetamide, benzamide, adipic acid, benzoic acid, citric acid; wherein the molar ratio of derivative(s) of methanesulfonic acid, ammonium salt(s) and hydrogen bond donor(s) is in the range 0.5-3:2-7:8-13. The NES having potential window ranging from 0.1 to 3.5 V and conductivity ranging from 10 to 90 mS/cm. Further the NES is having viscosity ranging from 1 to 60 mPa·s. NES remains liquid at a temperature as low as 5° C. at ambient pressure.

The NES is prepared by mixing one or more derivative(s) of methanesulfonic acid selected from its salts with various metal ions selected from a group consisting of manganese, zinc, cerium, nickel, titanium, copper, sodium, potassium and calcium; one or more ammonium salt(s) having general formula $NH_4X$, where X can be selected from a group consisting of chloride, methanesulfonate, acetate, sulphate, triflate, trimethanesulfonate ; one or more hydrogen bond donor(s) selected from a group consisting of urea, thiourea, glycerol, oxalic acid, acetic acid, ethylene glycol, acetamide, benzamide, adipic acid, benzoic acid, citric acid ; wherein the molar ratio of derivative(s) of methanesulfonic acid, ammonium salt(s) and hydrogen bond donor(s) is in the range 0.5-3:2-7:8-13 are mixed. Upon proper mixing, the mixture starts converting into a liquid at ambient temperature and pressure. To ensure the proper mixing of the components and to speed up the process, this mixture may be uniformly heated at a temperature up to 60° C. Once the eutectic solvent is prepared the same can be stored in a container, which remains liquid at a temperature as low as 5° C. at ambient pressure.

No special condition of heating/drying in a vacuum is required in the preparation of NES. Unlike many other eutectic solvents, the mixing of the constituting components is an endothermic phenomenon, making synthesis process safer, non-flammable than existing eutectic solvents. The resultant transparent liquid NES, according to the present invention, is allowed to attain the room temperature and stored in an airtight container and ready to be used for various applications.

The NES is safer to environment being non toxicity and easily disposable due to inherent nature of its constituents. Methanesulfonic acid is an organic acid which undergoes biodegradation to form carbon dioxide and sulphate. It is also regarded as the green acid as it is less toxic and corrosive in nature compared to the other mineral acids. The other components of the proposed NES are hydrogen bond donor(s) and one or more kind of ammonium salt making NES biodegradable and eco-friendly.

The NES is comparatively economical to the existing ESs as all the components are very economic and abundant in nature, making the proposed NES a sustainable eutectic solvent. The proposed NES has low viscosity, high thermal and chemical stability, wide potential window, low volatility and non-flammability. The unique chemistry and chemical bonding among the components make it chemically and thermally stable over the existing solvents. Due to its several advantages on the existing ES, ionic liquids and organic solvents, proposed NES has broad applications for including but not limited to the electrochemical application, energy storage devices, electroplating of metals their composites and their alloys, carbon dioxide capture, catalysis, organic synthesis, refinery process, biorefinery process, pharmaceutical, water treatment, metal processing, coatings, electroless coatings, metal nanoparticle synthesis, metal electropolishing, metal extraction, processing of the metal oxides, gas adsorption, biotransformation and electronics.

EXAMPLES

The following illustrative examples are provided to further describe how to make and use the preferred NES compositions according to present invention. The same are not intended to limit the scope of the claimed invention.

Example 1

In the process of preparing NES composition, 2 moles of Zinc Methanesulfonate, 10 moles of Thiourea and 5 moles of Ammonium Chloride are mixed in a rotary bottom flask. The flask is rotated @ 50 rpm for proper mixing. After rotating around 45 minutes the solid mixture start converting into NES solvent. However, in order to expedite the process for speedy result, the components are mixed in oil bath and the rotation is done at 45° C. for 15 minutes to obtain transparent liquid NES solvent.

Example 2

In the process of preparing NES composition, 1.7 moles of calcium methanesulfonate 9 moles of thiourea and 5 moles of Ammonium Chloride are mixed in a rotary bottom flask. The flask is rotated @ 50 rpm for proper mixing. After rotating around 45 minutes the solid mixture start converting into NES solvent. However, for speedy result, the components are mixed in oil bath and the rotation is done at 60° C. for 15 minutes to obtain transparent liquid NES solvent.

Example 3

In the process of preparing NES composition, 1.7 moles of calcium methanesulfonate, 10 moles of Ethylene Glycol and 4 moles of Ammonium Acetate are mixed in a rotary bottom flask. The flask is rotated @ 50 rpm for proper mixing. After rotating around 45 minutes the solid mixture start converting into NES solvent. However, for speedy result, the components are mixed in oil bath and the rotation is done at 45° C. for 15 minutes to obtain transparent liquid NES solvent.

IV. EXPERIMENTATION

Experiment 1

Cyclic voltammetry is done using Biologic VPM3 electrochemical workstation at 1 mV s−1 within the voltage range from −1.5 V to 2.5 V (versus Ag/AgCl) using a three-electrode system with graphite as the working electrode, Platinum Mesh as counter electrode, and Ag/AgCl as reference electrode, respectively.

Cyclic voltammograms of a three-electrode system. To determine the potential window of the NES number 1, three electrode system is used as mentioned above for CV experiment at a scan rate of 1 mV/s from −1.5 V to 2.5.

The cyclic voltammogram as shown in FIG. 1 for NES of example 1 indicates reversible electrochemical deposition/dissolution of Zinc. The corresponding onset potentials of initial Zinc plating/stripping are −0.31 V and −0.01 V. Compared to other existing solvents, smaller potential separation between plating and stripping and higher response current can be found for NES, suggesting better reversibility and faster kinetics of Zn deposition/dissolution. Notably, NES exhibits a wide stable electrochemical window from −1.5V to 2V. The Coulombic efficiency (CE) gradually increased and reached around 99.9% after the third cycle.

Experiment 2

To determine the metal electroplating and de-plating capacity in NES solution.

A Carbon Steel working electrode (Sheet: 10 mm*0.2 mm*50 mm) and a Zinc counter/reference electrode (diameter: 10 mm*0.2 mm*50 mm) with a rectangle shaped made up the Carbon steel//Zn asymmetric cells is suspended in NES of example 1.

Figure 2:
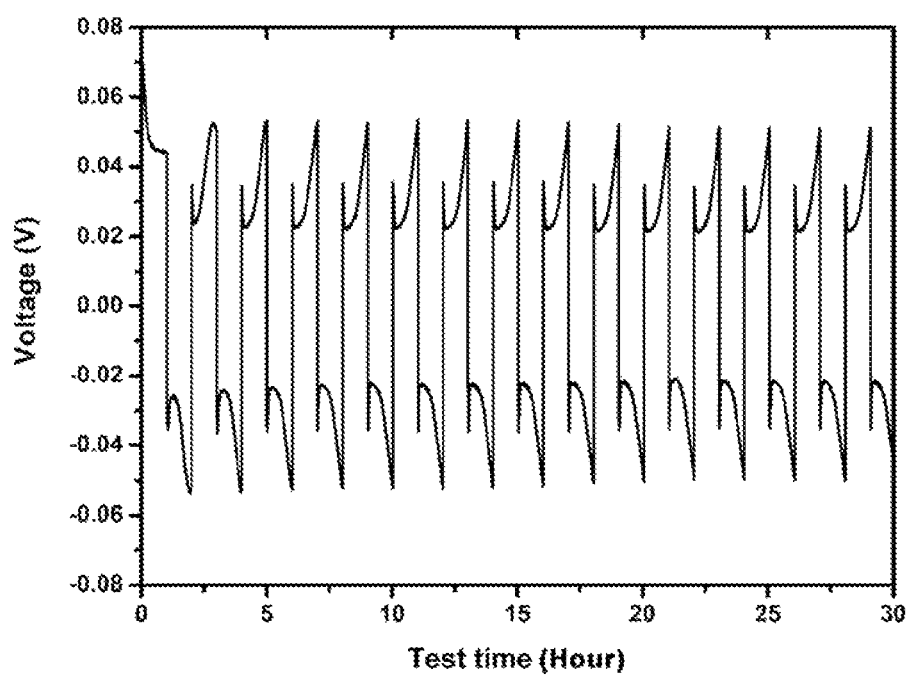
FIG. 2 is a graph depicting voltage-time electrochemical stability and electroplating characteristics of NES of Example 1 in an asymmetrical Carbon Steel/Zn set-up at 2.5 mA/cm² current.

The results of voltage-time electrochemical stability tests of the Zn-Carbon Steel asymmetrical cell is shown in FIG. 2. The NES shows good electroplating capabilities. It displays greater stability even at cycling.

Experiment 3

To determine the effect of temperature variation on the ionic conductivity and viscosity of NES of example 1.

A S230 Bench Conductivity Meter (Mettler-Toledo GmbH) is used to measure ionic conductivity. Before each experiment, the equipment is calibrated against a standard KCl solution.

An Dv2t Brookfield Viscometer is used to evaluate viscosities of NES

TABLE 1

| Temp (° C.) | Conductivity (mS/cm) | Viscosity (mPa · s) |
| --- | --- | --- |
| 10 | 25.97 | 50 |
| 20 | 58.39 | 20 |
| 25 | 62.71 | 15 |
| 30 | 64.92 | 13 |
| 35 | 68.81 | 11 |
| 40 | 71.91 | 10 |
| 50 | 75.26 | 7 |
| 60 | 81.42 | 5 |

For both the cases temperature are controlled within ±0.5° C. using a thermo-static, water bath.

The NES gives better ionic conductivity over the measured temperature range of 10 to 60° C., especially at elevated temperatures that increased from 25.97 to 81.42 mS/cm. This could be explained by the fact that as the temperature rises, the energy gained by the molecules in the NES medium rises along with a decrease in viscosity (from 50 mPa·s at 10° C. to 5 mPa·s at 60° C.) and thus the ions are in a higher energy state, resulting in increased mobility and thus increased conductivity in or NES. NES is thermally stable as no breakdown products are observed.

Figure 3:
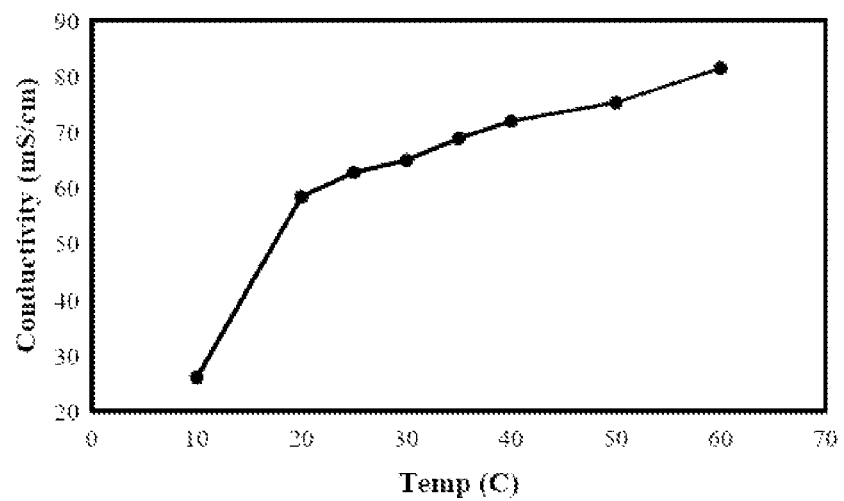
FIG. 3 is a graph depicting how, as temperature increases, the energy gained by the molecules in the NES of Example 1 increases along with decrease in viscosity and hence the ions are in a higher energy state which will lead to the mobility increases and hence the conductivity increases in NES.

Referring FIG. 3, as temperature increases the energy gained by the molecules in the NES increases along with decrease in viscosity and hence the ions are in a higher energy state which will lead to the mobility increases and hence the conductivity increases in NES.

Experiment 4

$CO_2$ absorption is measured using the developed NES of Examples 1, 2 and 3. $CO_2$ gas is flown into a vial (10 ml) holding 5 ml of developed NESs at a flow rate of 10 ml/min. Weighing the vial at regular intervals with a weighing balance with an accuracy of 0.1 mg is used to calculate the weight percent of $CO_2$ absorbed. The vial is kept partially immersed in a water bath at constant temperatures during the experiment to reduce the effect of temperature.

Test are prepared using the above method and tested using constant flow of $CO_2$ and at constant temperature of 27° C.

According to the screening of NESs, NES containing Calcium showed high $CO_2$ sorption capacity, when measured at atmospheric pressure for the fixed molar ratio of NES.

Table 2 represents the comparative $CO_2$ uptake of different NESs during 2 h of experiment.

TABLE 2

| NES | Temperature (° C.) | Pressure (Bar) | $CO_2$ uptake (in mole) |
|---|---|---|---|
| NES of Example 1 | 27 | ~1 | 0.283 |
| NES of Example 2 | 27 | ~1 | 0.461 |
| NES of Example 3 | 27 | ~1 | 0.398 |

Changes and modifications in the specifically-described embodiments may be carried out without departing from the principles of the present invention, which is intended to be limited only by the scope of the appended claims as interpreted according to the principles of patent law including the doctrine of equivalents.

The invention claimed is:

1. A eutectic solvent comprising:
   one or more derivative(s) of methanesulfonic acid selected from its salts with metal ions selected from the group consisting of manganese, zinc, cerium, nickel, titanium, copper, sodium, potassium, and calcium;
   one or more ammonium salt(s) having general formula $NH_4X$, where X is selected from the group consisting of chloride, methanesulfonate, acetate, sulphate, triflate, and trimethanesulfonate; and
   one or more hydrogen bond donor(s) selected from the group consisting of urea, thiourea, glycerol, oxalic acid, acetic acid, ethylene glycol, acetamide, benzamide, adipic acid, benzoic acid, and citric acid,
   wherein the molar ratio of derivative(s) of methanesulfonic acid, ammonium salt(s) and hydrogen bond donor(s) is in the range 0.5-3:2-7:8-13, respectively.

2. The eutectic solvent of claim 1, wherein the eutectic solvent has an electrochemical potential window ranging from 0.1 to 3.5 V.

3. The eutectic solvent of claim 1, wherein the eutectic solvent has ionic conductivity ranging from 10 to 90 mS/cm.

4. The eutectic solvent of claim 1, wherein the eutectic solvent has viscosity ranging from 1 to 60 mPa·s.

5. The eutectic solvent of claim 1, wherein the eutectic solvent remains liquid at a temperature of 5° C. at ambient pressure.

\* \* \* \* \*